US011697083B2

(12) United States Patent
Girondi

(10) Patent No.: US 11,697,083 B2
(45) Date of Patent: Jul. 11, 2023

(54) CARTRIDGE GROUP FOR FUEL FILTRATION

(71) Applicant: UFI FILTERS S.P.A., Porto Mantovano (IT)

(72) Inventor: Giorgio Girondi, Porto Mantovano (IT)

(73) Assignee: UFI FILTERS S.P.A., Porto Mantovano (IT)

( * ) Notice: Subject to any disclaimer, the term of this patent is extended or adjusted under 35 U.S.C. 154(b) by 245 days.

(21) Appl. No.: 17/049,698

(22) PCT Filed: Apr. 19, 2019

(86) PCT No.: PCT/IB2019/053276
§ 371 (c)(1),
(2) Date: Oct. 22, 2020

(87) PCT Pub. No.: WO2019/207450
PCT Pub. Date: Oct. 31, 2019

(65) Prior Publication Data
US 2021/0129058 A1    May 6, 2021

(30) Foreign Application Priority Data

Apr. 24, 2018  (IT) .................. 102018000004830

(51) Int. Cl.
*B01D 36/00* (2006.01)
*F02M 37/32* (2019.01)
(Continued)

(52) U.S. Cl.
CPC .......... *B01D 36/006* (2013.01); *F02M 37/32* (2019.01); *B01D 35/30* (2013.01);
(Continued)

(58) Field of Classification Search
CPC .............. B01D 36/006; B01D 35/30; B01D 2201/0415; B01D 2201/34; B01D 27/07;
(Continued)

(56) References Cited

U.S. PATENT DOCUMENTS 9,731,236 B2 * 8/2017 Girondi ............... B01D 36/005
2014/0197090 A1  7/2014 Popoff et al.

FOREIGN PATENT DOCUMENTS

CN      105190015 A      12/2015
DE      101 23 190 A1    11/2002
(Continued)

OTHER PUBLICATIONS

English Machine Translation of EP0655269A2 (Year: 1995).*
(Continued)

*Primary Examiner* — Madeline Gonzalez
(74) *Attorney, Agent, or Firm* — Merchant & Gould P.C.

(57) ABSTRACT

A cartridge group is for a filter assembly of a fuel filtration system. The cartridge group extends along an axis and includes a filter septum crossable in an axial direction by the fuel. The filter septum has an annular shape and defines at the axis a central cavity. A water separation and support device supporting the filter septum includes: i) a base element supporting the filter septum and presenting channels and/or holes through which the filtered fuel flows; ii) a tubular element extending into the central cavity presenting an outlet duct having a substantially annular cross-section delimited by an outer circumferential wall and an inner circumferential wall delimiting along the axis a through central passage; iii) a separator element crossable by the filtered fuel to be separated from the water. The separator element is housed on the base element and/or on the inner circumferential wall of the tubular element.

19 Claims, 10 Drawing Sheets

(51) Int. Cl.
*F02M 37/26* (2019.01)
*B01D 35/30* (2006.01)

(52) U.S. Cl.
CPC .. *B01D 2201/0415* (2013.01); *B01D 2201/34* (2013.01); *F02M 37/26* (2019.01)

(58) Field of Classification Search
CPC .... B01D 27/08; B01D 29/036; B01D 35/005; F02M 37/32; F02M 37/26
USPC .............. 210/232, 256, 315, 342, 455, 437, 210/439–444, 457, DIG. 5
See application file for complete search history.

(56) References Cited

FOREIGN PATENT DOCUMENTS

| | | |
|---|---|---|
| EP | 0 655 269 A2 | 5/1995 |
| EP | 0 702 144 A2 | 3/1996 |
| EP | 1 124 056 A2 | 8/2001 |
| EP | 2 181 747 A1 | 5/2010 |
| WO | 01/34273 A1 | 5/2001 |

OTHER PUBLICATIONS

International Search Report and Written Opinion of the International Searching Report for International Patent Application No. PCT/IB2019/053276 dated Jun. 27, 2019, 11 pages.

Italian Search Report for Italian Patent Application No. 102018000004830 dated Jan. 24, 2019, 2 pages.

* cited by examiner

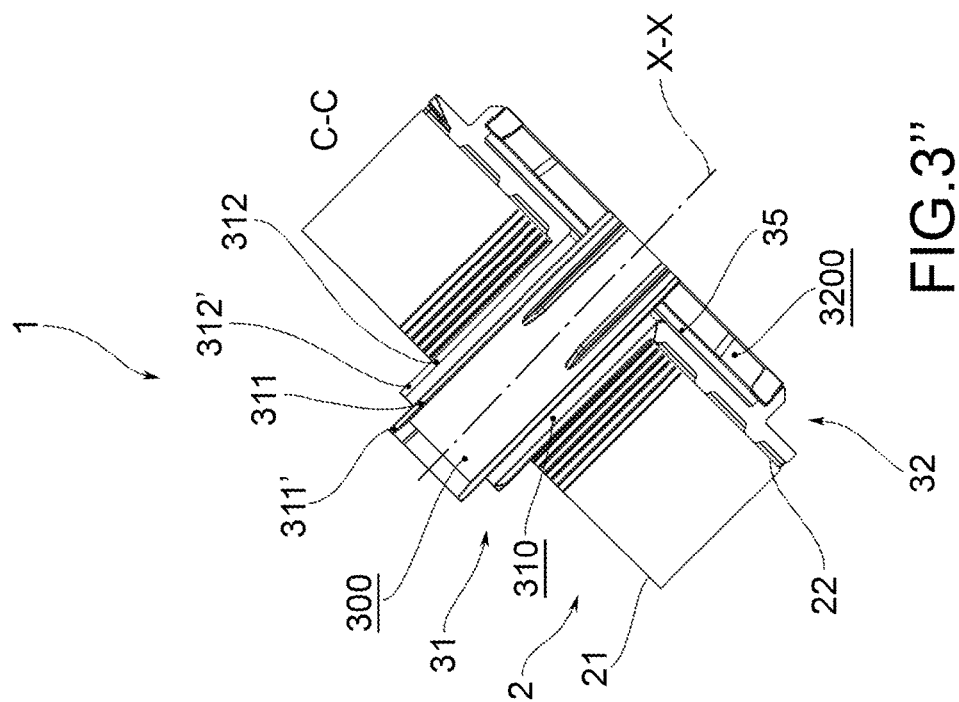
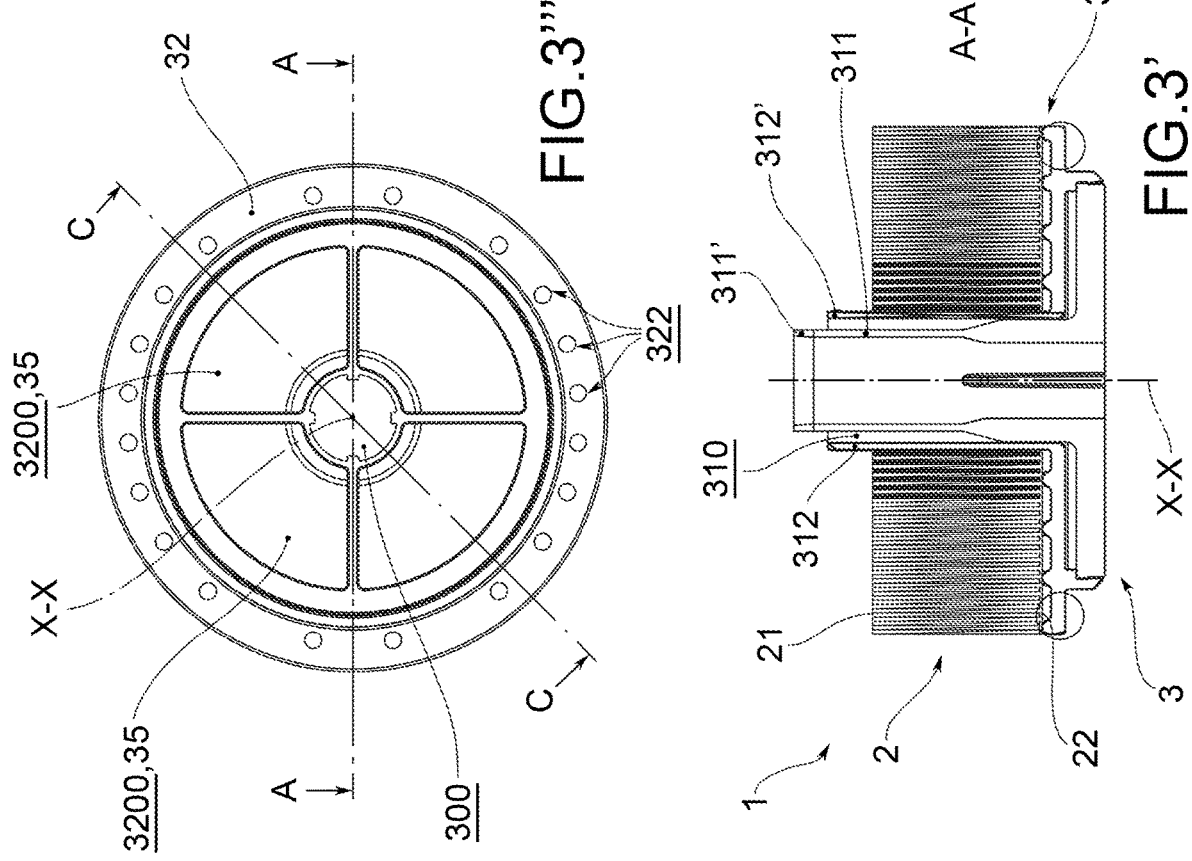

CARTRIDGE GROUP FOR FUEL FILTRATION

This application is a National Stage Application of PCT/IB2019/053276, filed 19 Apr. 2019, which claims benefit of patent application Ser. No. 102018000004830, filed 24 Apr. 2018 in Italy and which applications are incorporated herein by reference. To the extent appropriate, a claim of priority is made to each of the above-disclosed applications.

FIELD OF APPLICATION

The present invention relates to a cartridge group of a filter assembly of a fuel, preferably diesel, filtration system. In addition, the present invention also relates to the filter assembly comprising the cartridge group. Furthermore, the present invention also relates in turn to the filtration system comprising the cartridge group.

The context in which the cartridge group, the filter assembly and filtration system of the present invention lie is the automotive sector: being suitable to be fluidically connectable to the fuel circulation system wherein the fuel flows from the tank to the combustion chamber of the internal combustion engine.

Furthermore, it should be emphasized how, in the present description, the generic term "filtration" means both the capacity of the cartridge assembly to separate the dirt from the fuel, i.e. by blocking any suspended solid particles, and the capacity of the cartridge assembly to separate the fuel from the water comprised therein.

In this regard, in the state of the art, solutions of cartridge groups and filter assemblies are known in which the fuel is first filtered from the solid particles and secondly is separated from the water.

In the known solutions to perform the aforesaid different operations the cartridge groups have specially designed components: a particle filtration device and a water separation device.

In this context, with the need, always present in the automotive sector, to limit the dimensions of the vehicle components without reducing the number of components installed therein, solutions of substantially annular shaped cartridge groups have proliferated in which the fuel passes in a radial direction firstly a device for solid filtration and secondly a device for the separation of the water.

However, it has been found that in the production of such solutions a compromise had to be made: operating in a radial direction, but having limited dimensions, it was decided to sacrifice the radial dimension of the device for the particle filtration so as to provide the device for separation from water. However, this design choice is also reflected on the filtering capacities of said devices, in particular on the storage capacity of the solid contaminant (i.e. solid particles) before clogging the particle filter.

One example of an embodiment of a cartridge group having such drawback is shown in the document DE10123190A1.

SOLUTION ACCORDING TO THE INVENTION

In the light of the above, the need is strongly felt to provide a cartridge group with improved fuel filtration while respecting the need to limit the dimensions to ensure the installation of ancillary components such as sensors and/or purging devices. In other words, the need is strongly felt to have a cartridge group with effective particle filtration and effective separation of the water from the fuel, while bearing in mind the need of the technical sector to limit the overall dimensions as much as possible.

The purpose of the present invention is to provide a cartridge group, a filter assembly and a fuel filtration system in which the aforesaid need is fully satisfied and which also responds efficiently and effectively to the needs of the specific sphere of application.

DESCRIPTION OF THE DRAWINGS

Further characteristics and advantages of the invention will, in any case, be evident from the description given below of its preferred embodiments, made by way of a non-limiting example with reference to the appended drawings, wherein:

FIGS. 3' and 3" illustrate two cross-section views of a cartridge group according to the present invention, for example suitable to be part of a filter assembly according to FIGS. 1 and 1*a* along two different axial cross-section planes;

FIG. 3''' shows a view from below of the cartridge group according to the present invention as in FIGS. 3' and 3";

DETAILED DESCRIPTION

Figure 1:
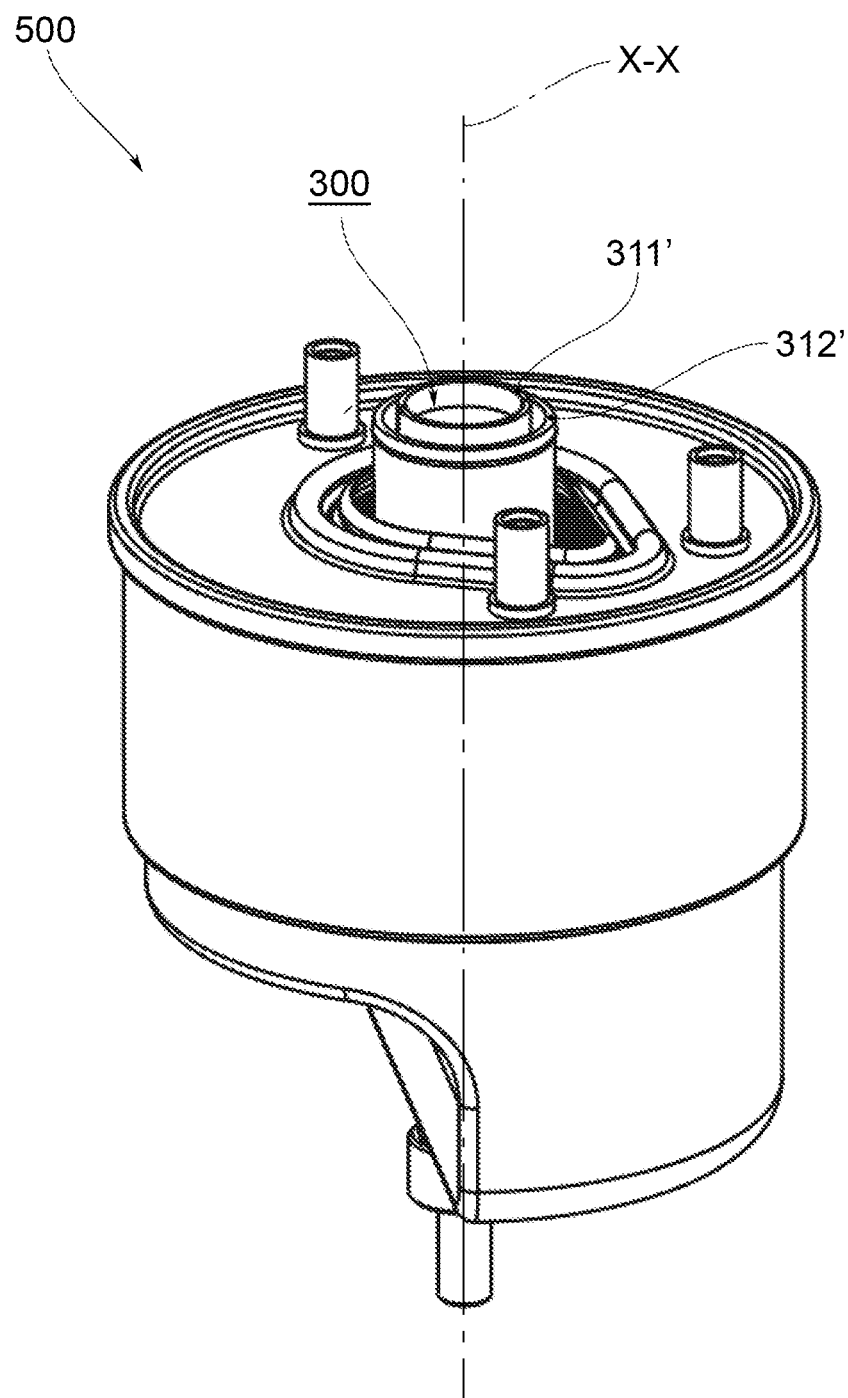
FIG. 1 shows a perspective view of a filter assembly of the present invention, according to a preferred embodiment.
Figure 1A:
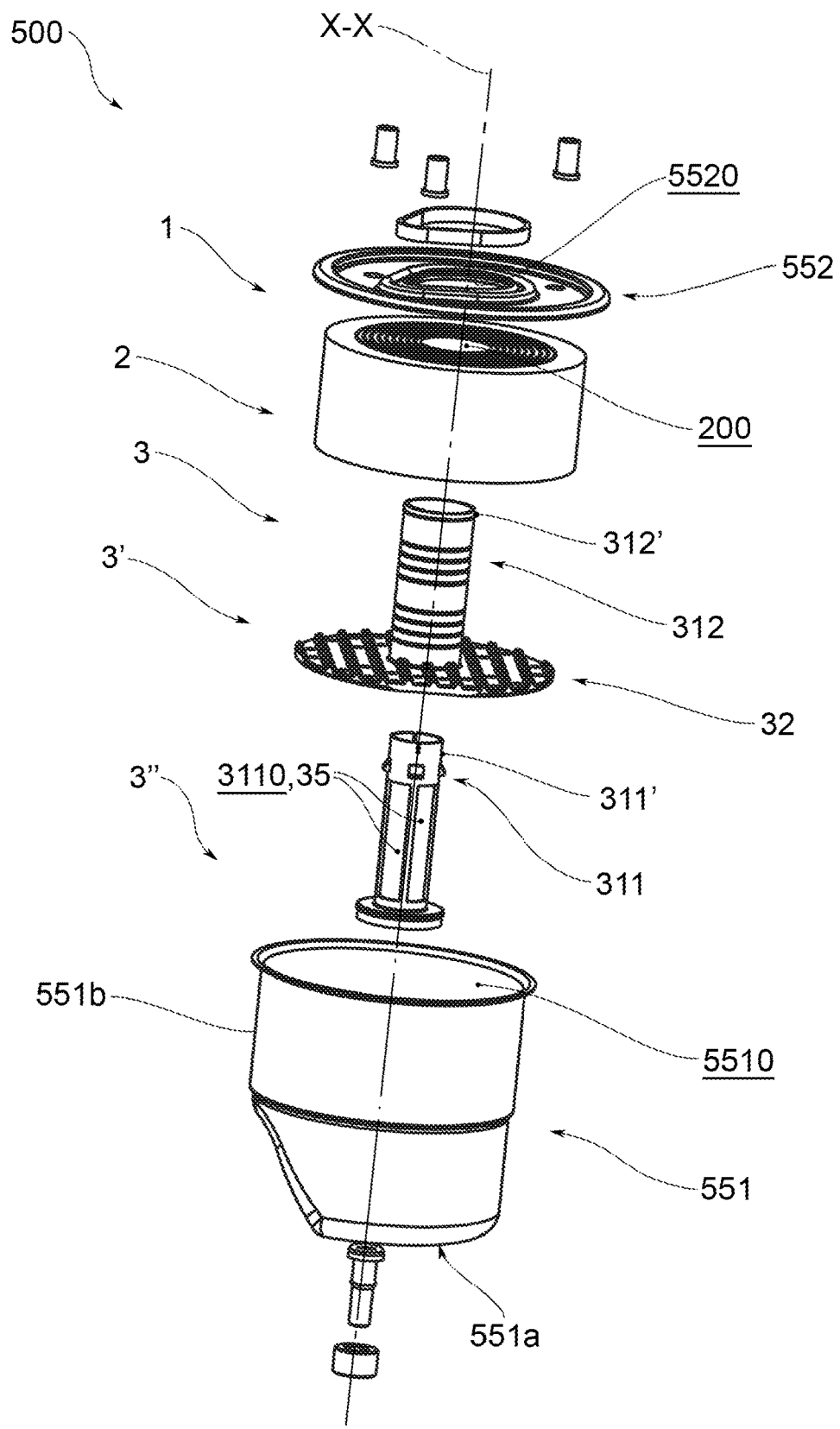
FIG. 1*a* shows a perspective view in separate parts of the filter assembly shown in FIG. 1.
Figure 2:
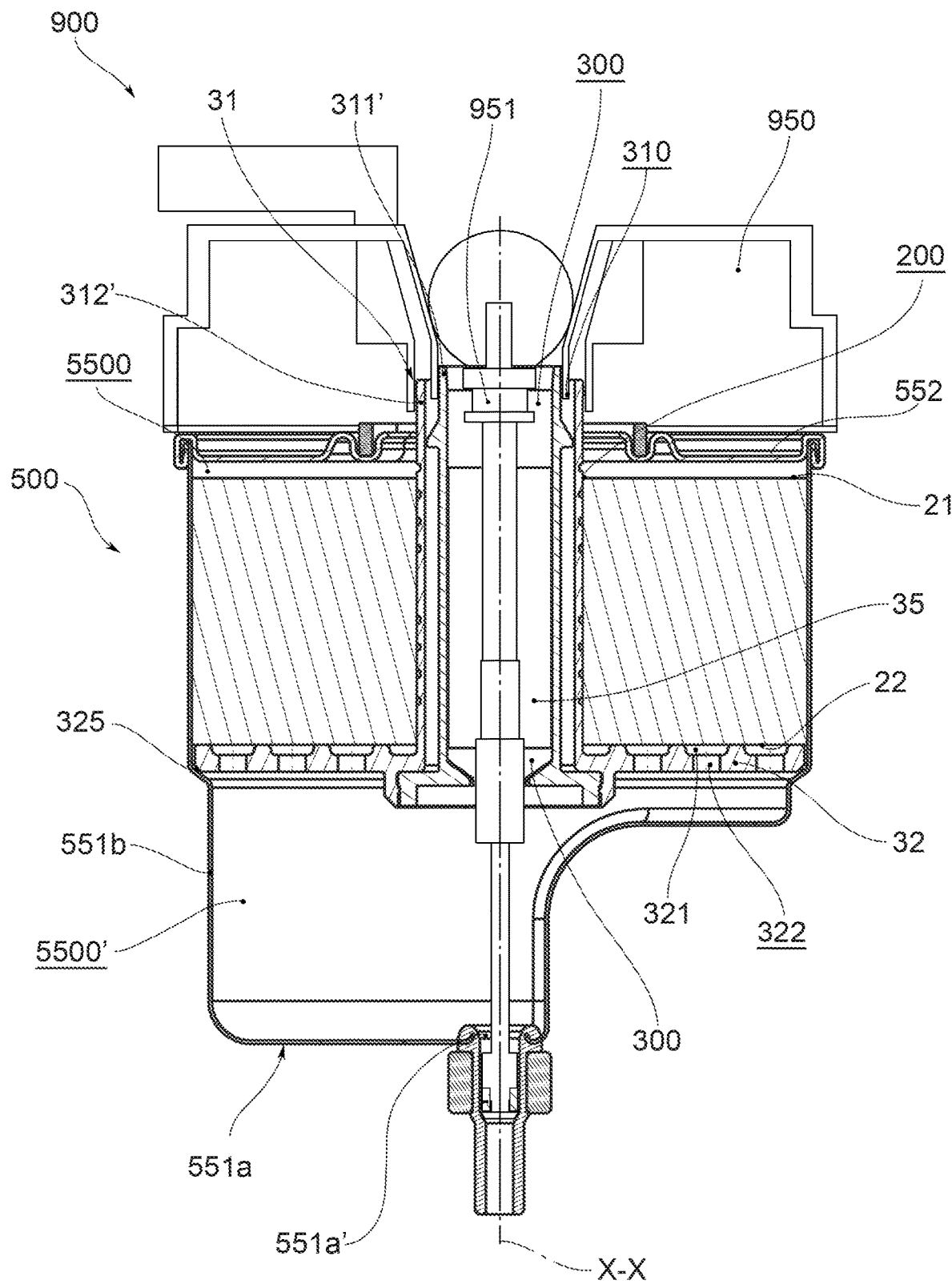
FIG. 2 shows a schematic, cross-section view of a fuel filtration system comprising the filter assembly in FIG. 1.
Figure 3A:
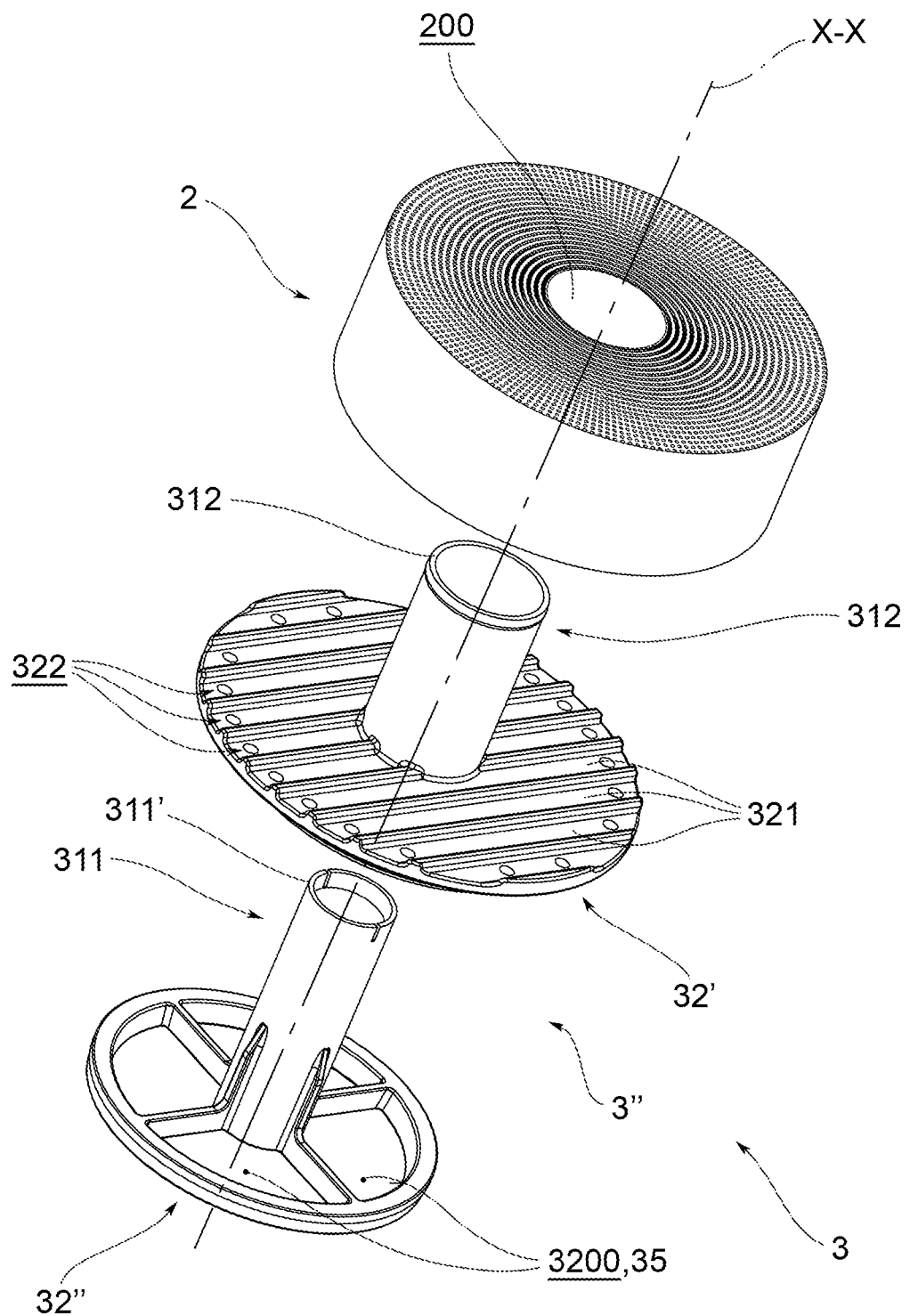
FIG. 3*a* shows a perspective view in separate parts of the cartridge group in FIG. 3', 3", 3'''.
Figure 4:
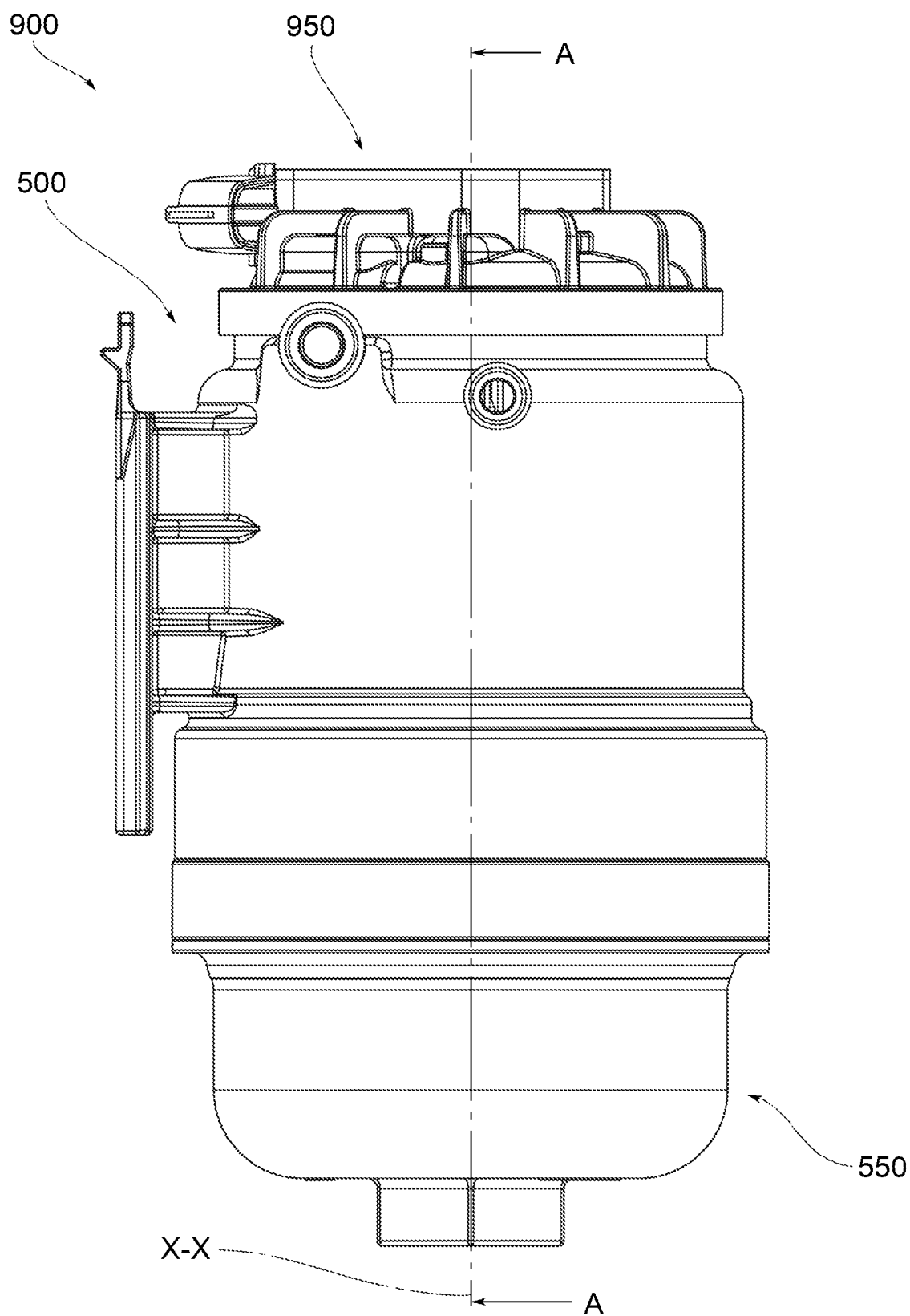
FIG. 4 shows a side view of a fuel filtration system comprising a filter assembly according to a preferred embodiment.
Figure 4A:
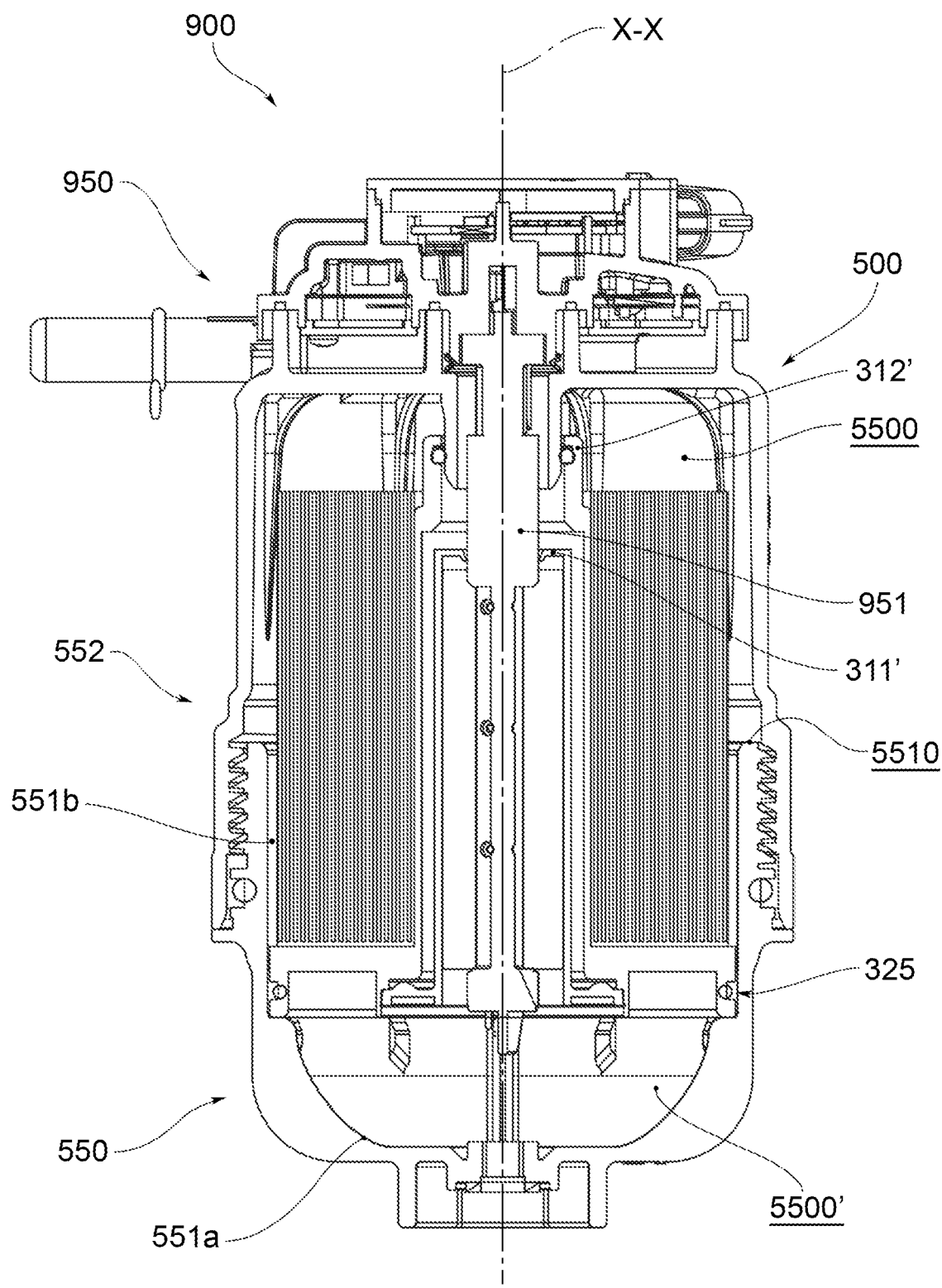
FIG. 4*a* shows a cross-section view of the fuel filtration system in FIG. 4.
Figure 5:
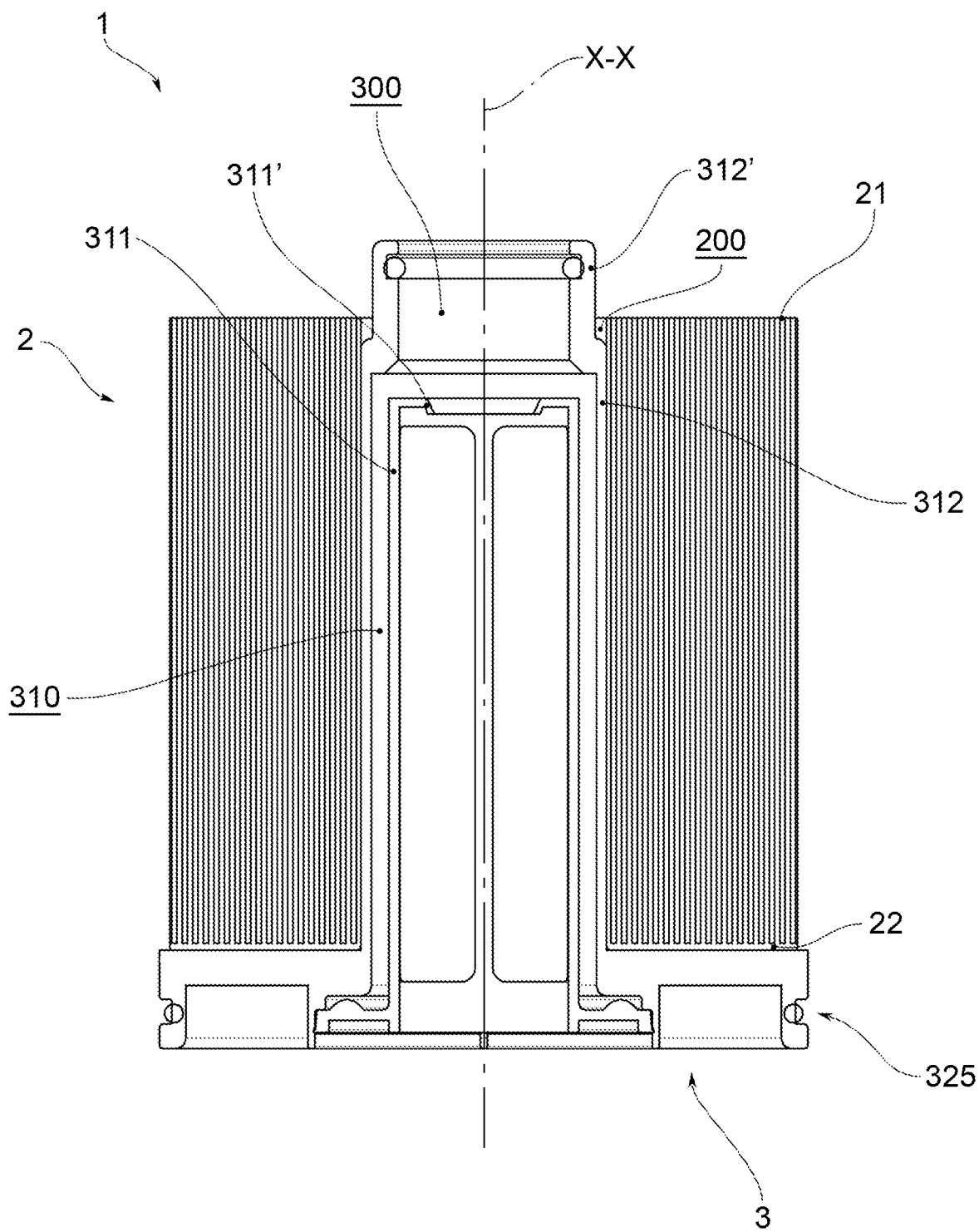
FIG. 5 shows a cross-section view of a cartridge group according to the present invention, for example suitable to be part of a filter assembly according to FIGS. 4 and 4*a*.
Figure 5A:
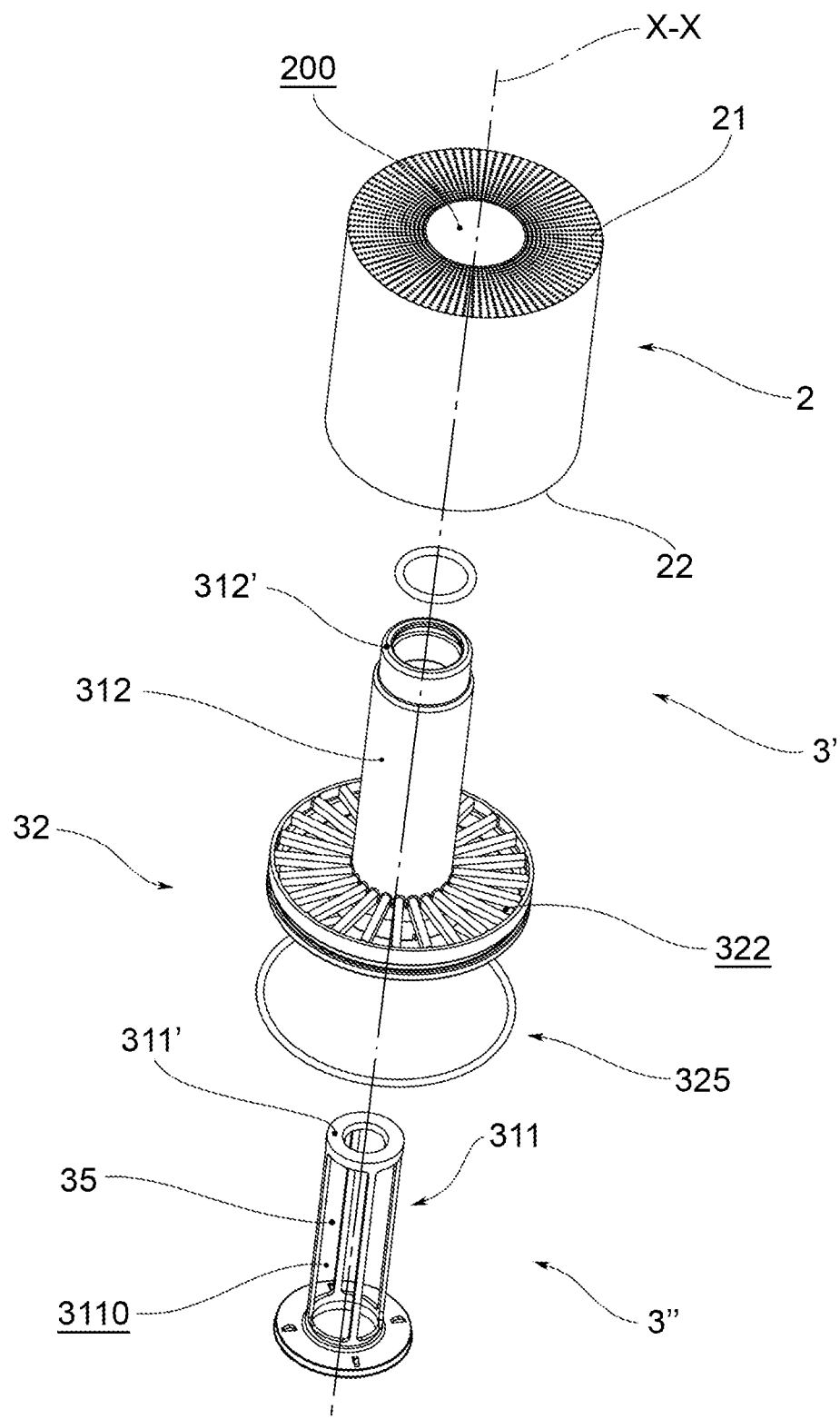
FIG. 5*a* shows a perspective view in separate parts of the cartridge group in FIG. 5.
Figure 6:
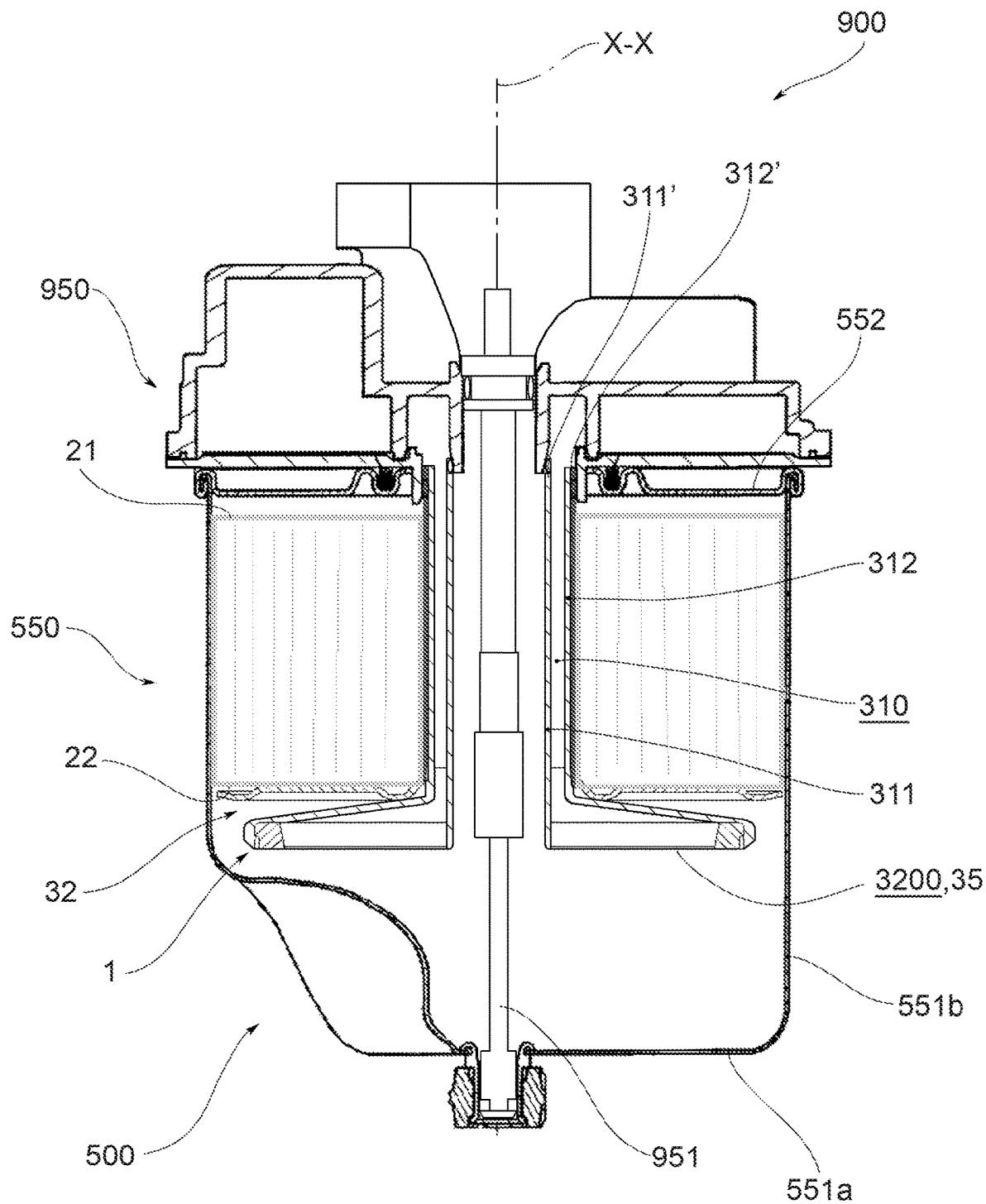
FIG. 6 shows a schematic, cross-section view of a fuel filtration system comprising a filter assembly according to a further preferred embodiment.

In the attached drawings, reference numeral 1 denotes a cartridge group according to the present invention. The filter assembly which also comprises the cartridge group 1 is instead denoted by reference numeral 500. In addition, reference numeral 900 denotes a fuel, preferably diesel, filtration system which comprises the cartridge group 1 and the filter assembly 500.

As mentioned above, the fuel filtration system 900 is specifically suitable for being fluidically connected to the fuel circulation system. In particular, the system 900 comprises a filter assembly 500 placed fluidically upstream of the engine combustion chamber so that the fuel which reaches it is filtered of the solid particles and water allowing effective combustion and functioning of the engine to be achieved and an adequate protection of the components placed fluidically downstream of the cartridge group.

According to the present invention, the fuel filtration system 900 comprises a head member 950 specifically suitable to perform the fluidic connection with the circuit ducts and the cartridge group 1 (and the filter assembly 500 in which it is suitable to be positioned). Specifically, the head member 950 has special fluidic connections in such a way as to receive dirty fuel and to release filtered and clean fuel.

There are a variety of embodiments of the head member 950 depending on its applications: for example, in some embodiments, the head member 950 comprises components for heating the incoming fuel. Or again, the head member 950 comprises a rod-shaped device 951 extending and lying at the axis X-X such as a purge rod and/or support rod of the water level measurement sensor.

The present invention also relates to a filter assembly 500 suitable to be part of the fuel filtration system 900. Such filter assembly 500 comprises a cartridge group 1 such as that amply described below.

According to some preferred embodiments, the cartridge group 1 is replaceable in maintenance operations.

In addition, the filter assembly 500 comprises a filter body 550 which defines within it a filtration chamber 5500 where filtration occurs and where the cartridge group 1 is positioned.

According to other preferred embodiments, it is the entire filter assembly 500 which is replaceable in maintenance operations being detachably fixed to the head member 950; in this case, the filter assembly 500 is replaced together with the cartridge group 1.

According to the present invention, said filter body 550 extends axially along the axis X-X and comprises a cup element 551 comprising a bottom wall 551a, side walls 551b and a cup opening 5510 opposite the bottom wall 551a and defined around its perimeter by said side walls 551b.

According to the present invention, near the bottom wall 551a, the filtration chamber 5500 has a water collection region 5500'.

According to a preferred embodiment, the bottom wall 551a has a purge hole 551a' positioned at the axis X-X, the opening of which allows drainage of the water collected in the water collection region 5500'.

In addition, the filter body 550 comprises a closing lid element 552 of the cup opening 5510.

Preferably, said lid element 552 comprises at the axis X-X a lid opening 5520 through which the filtered fuel flows. The unfiltered fuel coming from the tank enters from an opening provided on said lid element (not shown).

According to a preferred embodiment, the cup element 551 and lid element 552 are made of metal and are crimped together so as to create a single filter body 550.

According to other embodiments, cup element 551 and lid element 552 are be mutually joinable by reciprocal screwing. In such embodiments, as example, cup element 551 and lid element 552 have the form of two semi-shells, preferably in plastic material.

According to the present invention, the cartridge group 1 extends along the axis X-X and comprises two distinct components: a filter septum 2 and a water separation and support device 3.

According to the present invention, the filter septum 2 is crossable in the axial direction by the fuel, extending in height parallel to the axis X-X.

The filter septum 2 extends axially between an upper end 21 and a lower end 22. The dirty fuel enters the filter septum 2 from the upper end 21 to exit filtered from solid particles from the lower end 22.

According to the present invention, the filter septum 2 does not have end plates, but has substantially open end walls both at the upper end and at the lower end.

According to the present invention, the filter septum 2 has an annular shape and defines at the axis X-X a central cavity 200.

According to the present invention, the filter septum 2 has radial dimensions substantially equal to the diameter defined by the inner wall of the filter body 550.

In addition, according to the present invention, the filter septum 2 comprises a filter medium wound in a roll. Preferably, the filter medium is composed of a cellulose and/or glass fibre and/or viscose and/or synthetic fibre such as nylon, polyester or a mixture thereof. According to a preferred embodiment, the filter medium is made of fibrous material able to retain and accumulate solid particles and cause a coalescence effect on the water droplets emulsified in the fuel.

According to the present invention, the water separation and support device 3 has the dual purpose of supporting the filter septum 2 and performing, on the fuel flowing out, exiting from the filter septum 2, the separation action from the water.

According to the present invention, the water separation and support device 3 supports the filter septum 2 to the filter body 550 and is sealingly engaged by the head member 950.

The water separation and support device 3 comprises in fact a base element 32 engaging the lower end 22 of the filter septum 2.

The base element 32 has channels 321 and/or holes 322 through which the filtered fuel in output from the lower end 22 flows.

According to a preferred embodiment, the base element 32 has a main extension substantially radial to the axis X-X.

According to other embodiments, the base element 32 has substantially a planar shape. In other embodiments, the base element 32 is substantially disc-shaped. In other embodiments the base element 32 is substantially cone-shaped. In other embodiments the base element 32 has an even more complex shape.

According to the present invention, the channels 321 and the holes 322 are positioned and shaped to make the fuel flow in output from the lower end 22 in a region radially distal to the axis X-X.

According to the present invention, the water separation and support device 3 further comprises a tubular member 31 extending into the central cavity 200 along the axis X-X starting from the base element 32.

The tubular member 31 has a substantially annular cross-section outlet duct 310. In other words, the tubular element 31 surrounds said outlet duct. In particular, the outlet duct 310 is fluidically connected to the head member 950 to allow the flow of the filtered fuel.

The outlet duct 310 is defined by an outer circumferential wall 312 which engages the inner wall of the filter septum 2 and by an inner circumferential wall 311 that defines along the axis X-X a through central passage 300.

The outer circumferential wall 312 is suitable to support the inner wall of the filter septum 2 which defines the central cavity 200. Preferably, the outer circumferential wall 312 is non-perforated and prevents a radial flow of the fuel that is forced to cross the filter septum 2.

According to the present invention, moreover, the outer circumferential wall 312 and the inner circumferential wall 311 comprise at the top an outer sealing edge 312' and an inner sealing edge 311' sealingly engaging the head member 950.

In other words, the outer circumferential wall 312 and the inner circumferential wall 311 in a distal portion thereof from the base element 32 comprise the outer sealing edge 312' and the inner sealing edge 311' thanks to which the fluidic connection with the head member 950 is obtained to ensure the flow of filtered fuel to the motor.

According to a preferred embodiment, the outer sealing edge 312' and the inner sealing edge 311' house respective gaskets or O-rings for the sealed engagement with the head member 950.

According to a preferred embodiment the outer circumferential wall 312 and the inner circumferential wall 311 are made of plastic material. This way the outer sealing edge 312' and/or the inner sealing edge 311' may have a specific coupling profile that allows a hermetic seal to be achieved with the head member without the use of additional gaskets.

Preferably, said engagement is obtained by mutual insertion in the axial direction so that the seal between the components is subsequently obtained in a radial direction.

According to a preferred embodiment, both the outer sealing edge 312' and the inner sealing edge 311' are positioned in a higher axial position than the upper end 21 of the filter septum 2.

According to a preferred embodiment, said inner sealing edge 311' is located in a higher axial position than the outer sealing edge 312'.

According to said embodiment, said inner sealing edge 311' comprises a circumferential lip suitable to engage in a radial direction a sealing surface provided on the head member 950.

According to a preferred embodiment, the inner sealing edge 311' comprises a circumferential lip suitable for engaging in a radial direction a rod-shaped device 951 comprised in the head member 950. In particular, said circumferential lip extends in a radial direction in the central through passage 300 to engage the rod-shaped device 951 and perform with it a sealing action.

Preferably, in said preferred embodiment, the inner sealing edge 311' is located in a lower axial position than the outer sealing edge 312'.

In addition, according to the present invention, the water separation and support device 3 comprises a separator element 35 crossed by the filtered fuel to be separated from the water. In other words, thanks to the separator element 35, the desired effect of separating the water and any water-based crystals present in the fuel previously filtered by the filter septum 2 is achieved.

According to the present invention, said separator element 35 is located at the inlet side of the outlet duct 310. This way, the fuel filtered by the filter septum 2 and separated from the water by the separator element 35 flows into the outlet duct 310.

According to the present invention the separator element 35 is housed on the base element 32 and/or on the inner circumferential wall 311 of the tubular member 31.

According to a preferred embodiment of the present invention, the tubular member 31 has on the inner circumferential wall 311 at least one through opening 3110 (i.e. the circumferential through opening extending along a circumferential portion and being crossed in a radial direction relative to the axis X-X) in input to the outlet duct 310, wherein the separator element 35 has the form of a hydrophobic mesh positioned on said circumferential through opening 3110.

Preferably, circumferentially there are a plurality of circumferential through openings 3110 through which the filtered fuel flows in a radial direction. Preferably, the circumferential through openings 3110 are angularly equally spaced from each other. Preferably, in the axial direction also there are a plurality of circumferential through openings 3110.

According to a preferred embodiment, the inner circumferential wall 311 has the form of a tubular frame (defining said circumferential through openings 3110) on which the separator element 35 is positioned.

According to a preferred embodiment, the base element 32 has at least one through opening 3200 (i.e. the axial through opening having a substantially planar extension relative to a planar plane orthogonal to the axis X-X and crossable in an axial direction parallel to the axis X-X) in input to the outlet duct 310, wherein the separator element 35 has the form of a hydrophobic mesh positioned on said through opening 3200.

Preferably, relative to the axis X-X, a plurality of axial through openings 3200 are positioned, through which the filtered fuel flows in an axial direction, parallel to the axis X-X. Preferably, the axial through openings 3200 are positioned angularly equally spaced from each other. Preferably, in the radial direction too there are a plurality of axial through openings 3200. In other words, the base element has a plurality of through openings through which the filtered fuel flows in an axial direction.

According to a preferred embodiment, the base element 32 has the form of a substantially planar frame (defining said circumferential through openings 3200) on which the separator element 35 is positioned.

According to a preferred embodiment of the present invention, the base element 32 comprises a sealing device 325 suitable to sealingly engage the walls of the filter body 550, in particular the side walls 551b. In other words, the base element 32 engages the filter body 550 dividing the filtration chamber 5500 into two distinct parts (i.e. sub-chambers), the upper part where the solid filtration occurs and the lower part where the separation of the fuel from the water occurs (with the water which is blocked by the separator element, collecting in the water collection region 5500'). According to a preferred embodiment, the base element 32 comprises an external lateral wall that extends axially parallel to the axis X-X and that engages the external lateral surface of the filter septum 2.

According to a preferred embodiment, the sealing device 325 sealingly engages the filter body 550 in the radial direction.

According to the present invention, there are multiple modes in which the water separation and support device 3 having the above-described characteristics is composed.

According to a preferred embodiment, the water separation and support device 3 is composed of a main component 3' and a secondary component 3" engageable to each other so as to define the outlet duct 310.

Preferably, the main component 3' comprises the outer circumferential wall 312 and the secondary component 3" comprises the inner circumferential wall 311.

According to a preferred embodiment, the main component 3' also comprises the base element 32.

According to an embodiment, the main component 3' and the secondary component 3" are mutually engaged in such a manner as to define the base element 32 in which the main component 3' comprises a main base portion 32' which engages the lower end 22 of the filter septum 2 and the secondary component 3" comprises a secondary base portion 32".

According to a preferred embodiment, the secondary base portion 32" is hermetically coupled and axially spaced from the bottom surface of the main base portion 32' to define a fluidic passage in communication with the outlet duct 310.

According to a preferred embodiment, the main component 3' and the secondary component 3" are reciprocally engaged by mutual axial insertion.

According to a preferred embodiment, the main component 3' and the secondary component 3" are mutually engaged to each other by insertion in roto-translation, such as mutual coupling by screwing or bayonet.

In other preferred embodiments, the main component 3' and the secondary component 3" are mutually engaged by welding.

According to the above embodiments, solutions in which only the secondary component 3" houses the separator element 35 may be provided for. This way the design and contextual production is particularly simplified.

The present invention also relates to a fuel, preferably diesel, filtration system 900 of solid particles and water, comprising a head member 950 fluidically connected to a fuel circuit.

According to this embodiment, and as shown in the appended drawings, the cartridge group 1 is sealingly engaged to the head member 950 so that the latter receives the filtered fuel separated from the water which flows into the outlet duct 310. In addition, the head member 950 comprising a rod-shaped device 951, such as a purge rod and/or support rod of a water level sensor, installed along the axis X-X inside the central through passage 300 of the cartridge group 1.

Preferably, as described above, the inner sealing edge 311' of the cartridge group engages said head member 950 or said rod-shaped device 951. Preferably, as described above, the outer sealing edge 312' of the cartridge group engages the head member to define the annular outlet duct 310.

According to a preferred embodiment, the head member 950 is sealingly engaged to the filter body 550. Preferably, in fact, the head member 950 is sealingly engaged to the filter assembly 500.

In addition, according to a preferred embodiment in which the filter body 550 comprises, in a proximal region to the bottom wall 551a, a water collection region 5500' (i.e. positioned below the base element 32), said rod-shaped device 951 extends along the axis X-X as far as said water collection area. In particular, the rod-shaped device 951 extends in length to engage the bottom wall 551a and a purge hole 551a' provided thereon. Preferably, in a preferred embodiment, the extraction of the filter assembly 500 from the head member 950 allows the extraction of the rod-shaped device 951 and the simultaneous discharge of the water collected in the water collection region 5500'. In a preferred embodiment it is possible to extract the rod-shaped device 951 while maintaining the filter assembly 500 engaged to the head member 950: preferably, therefore, the extraction of the rod-shaped device 951 and the simultaneous discharge of the water collected in the water collection region 5500' precedes the subsequent extraction of the filter assembly 500 from the head member 950.

According to some preferred embodiments, even in a configuration with the rod-shaped device 951 extracted, the sealed engagement between the outlet duct 310 and head member 950 is maintained (in particular with collars or collectors specifically provided); even in a configuration with the rod-shaped device 951 extracted, the dirty side and the clean side of the filter assembly do not merge but remain fluidically separated.

Innovatively, the cartridge group, the filter assembly and fuel filtration system described above amply fulfil the purpose of the present invention overcoming the drawbacks typical of the prior art.

Advantageously, in fact, the cartridge group is suitable to optimise fuel filtration operations while having reduced dimensions.

Advantageously, the cartridge group has an optimized solid particle filtration action of the fuel.

Advantageously, the filter septum has a larger filtering surface than the annular filter medium solutions (radially crossed).

Advantageously, the cartridge group also optimizes the separation from the water, presenting a wide hydrophobic surface that must be crossed by the fuel before coming out of the filter cartridge through the outlet duct.

Advantageously, the cartridge group has a water separation and support device with a simple geometry and simple to be manufactured. In particular, the coupling between the support device and the separator element is advantageously made without additional gaskets, reducing the cost of the solution.

Advantageously, the cartridge group also uses the walls of the outlet duct to separate water from fuel.

Advantageously the positioning of an axial filter (i.e. the filter septum) upstream of a separator allows the water separation efficiency to be maximized as the filtered fuel undergoes a change of direction that improves the pre-separation of the heavier components dispersed in the fuel (such as water) before reaching the separator.

Advantageously, the relative arrangement of the filter septum and hydrophobic separator makes it possible to perform a simple and effective coupling of the cartridge group to the head member without affecting the possibility of installing auxiliary, through, rod-shaped components in the inner cavity of the filter (such as sensors or purging devices) needed for the operation of the filtering device.

Advantageously the cartridge group is installable in already existing filter assemblies to improve filtration and water separation performance.

Advantageously, the filter septum of the type in filtering material with coalescent properties facilitates (and in some cases performs, using gravitational action) the action of separating the water from the fuel.

It is clear that a person skilled in the art may make modifications to the cartridge group, filter assembly and fuel filtration system described above so as to satisfy contingent requirements, all contained within the scope of protection as defined by the following claims.

LIST OF REFERENCE NUMBERS

1 cartridge group
2 filter septum
21 upper end
22 lower end
200 central cavity
3 water separation and support device
31 tubular element
310 outlet duct
311 inner circumferential wall
3110 circumferential through opening
311' inner sealing edge
312 outer circumferential wall
312' outer sealing edge
300 central through passage
32 base element 321 channels
322 holes
325 sealing device
3200 axial through openings
3' main component
32' main base portion
3 secondary component
32" secondary base portion
500 cartridge assembly
550 filter body
551 cup element
551a bottom wall
551a' purge hole
551b side walls
5510 cup opening
552 lid element
5520 lid opening
5500 filtration chamber
5500' water collection region
900 fuel filtration system
950 head member
951 rod-shaped device
X-X axis

The invention claimed is:

1. A cartridge group of a filter assembly of a fuel filtration system of solid particles and water, wherein the filtration system comprises a head member to which the filter assembly is engageable and comprises a rod-shaped device comprising a purge rod and/or support rod for a water level sensor, wherein the cartridge group is housed in a filter body of the filter assembly and wherein the cartridge group extends along an axis and comprises:
   a filter septum crossable in an axial direction by fuel and extending in height parallel to the axis between an upper end and a lower end, wherein the filter septum has an annular shape and defines at the axis a central cavity;
   a water separation and support device supporting the filter septum to the filter body and engageable by the head member comprising:
   i) a base element engaging the lower end of the filter septum, wherein the base element has a main extension substantially radial to the axis and wherein the base element has channels and/or holes through which filtered fuel flows in output from the lower end;
   ii) a tubular element extending into the central cavity along the axis from the base element, wherein the tubular element has an outlet duct with a substantially annular cross-section defined by an outer circumferential wall which engages an inner wall of the filter septum and by an inner circumferential wall which defines along the axis a through central passage, wherein in said through central passage said rod-shaped device is extendable at the axis, wherein the outer circumferential wall and the inner circumferential wall respectively comprise at a top an outer sealing edge and an inner sealing edge sealingly engaging the head member;
   iii) a separator element crossable by the filtered fuel to be separated from the water, wherein said separator element is housed on the base element and/or on the inner circumferential wall of the tubular element so that in the outlet duct flows the fuel filtered by the filter septum and separated from the water by the separator element.

2. The cartridge group according to claim 1, wherein both the outer sealing edge and the inner sealing edge are positioned in a higher axial position than the upper end of the filter septum.

3. The cartridge group according to claim 2, wherein the inner sealing edge is located in a lower axial position than the outer sealing edge.

4. The cartridge group according to claim 1, wherein the inner sealing edge comprises a circumferential lip for engaging in a radial direction the rod-shaped device.

5. The cartridge group according to claim 1, wherein the tubular element has on the inner circumferential wall a plurality of circumferential through openings in input to the outlet duct, wherein the separator element comprises a hydrophobic mesh positioned on said circumferential through openings.

6. The cartridge group according to claim 1, wherein the base element has a plurality of axial through openings in input to the outlet duct, wherein the separator element comprises a hydrophobic mesh positioned on said axial through openings.

7. The cartridge group according to claim 1, wherein the base element comprises a sealing device for sealingly engaging walls of the filter body.

8. The cartridge group according to claim 1, wherein the water separation and support device comprises a main component and a secondary component reciprocally sealingly engageable to define the outlet duct, wherein the main component comprises the outer circumferential wall and the secondary component comprises the inner circumferential wall.

9. The cartridge group according to claim 8, wherein the main component comprises the base element.

10. The cartridge group according to claim 8, wherein the main component and the secondary component are mutually engaged to define the base element in which the main component comprises a main base portion which engages the lower end and the secondary component comprises a secondary base portion.

11. The cartridge group according to claim 8, wherein the main component and the secondary component are mutually engaged with each other by mutual axial insertion and/or by roto-translational insertion.

12. The cartridge group according to claim 1, wherein the fuel comprises diesel fuel.

13. A filter assembly for a fuel filtration system of solid particles and water, wherein the fuel filtration system comprises a head member to which the filter assembly is engageable and comprises a rod-shaped device comprising a purge rod and/or support rod for a water level sensor, the filter assembly comprising:
   a filter body extending along an axis;
   a cartridge group housed in the filtered body, wherein the cartridge group extends along the axis and comprises:
      a filter septum crossable in an axial direction by fuel and extending in height parallel to the axis between an upper end and a lower end, wherein the filter septum has an annular shape and defines at the axis a central cavity;
      a water separation and support device supporting the filter septum to the filter body and engageable by the head member comprising:
      i) a base element engaging the lower end of the filter septum, wherein the base element has a main extension substantially radial to the axis and wherein the base element has channels and/or holes through which filtered fuel flows in output from the lower end;

ii) a tubular element extending into the central cavity along the axis from the base element, wherein the tubular element has an outlet duct with a substantially annular cross-section defined by an outer circumferential wall which engages an inner wall of the filter septum and by an inner circumferential wall which defines along the axis a through central passage, wherein in said through central passage said rod-shaped device is extendable at the axis, wherein the outer circumferential wall and the inner circumferential wall respectively comprise at a top an outer sealing edge and an inner sealing edge sealingly engaging the head member;

iii) a separator element crossable by the filtered fuel to be separated from the water, wherein said separator element is housed on the base element and/or on the inner circumferential wall of the tubular element so that in the outlet duct flows the fuel filtered by the filter septum and separated from the water by the separator element;

wherein the filter body comprises:
a cup element comprising a bottom wall, side walls and a cup opening opposite the bottom wall and defined around a perimeter by said side walls;
a lid element closing the cup opening which comprises at the axis a lid opening through which the fuel in output flows; and wherein the entire filter assembly is removably fixed to the head member.

14. The filter assembly for a fuel filtration system according to claim 13, wherein the inner sealing edge engages said rod-shaped device.

15. The filter assembly for a fuel filtration system according to claim 13, wherein the head member is sealingly engaged to the filter body.

16. The filter assembly for a fuel filtration system according to claim 13, wherein the fuel comprises diesel fuel.

17. A fuel filtration system for filtration of solid particles and water, the fuel filtration system comprising:
a head member comprising a rod-shaped device comprising a purge rod and/or support rod for a water level sensor;
a filter assembly engageable with the head member, the filter assembly comprising a filter body, and a cartridge group housed in the filter body; wherein the cartridge group extends along an axis and comprises:
a filter septum crossable in an axial direction by fuel and extending in height parallel to the axis between an upper end and a lower end, wherein the filter septum has an annular shape and defines at the axis a central cavity;
a water separation and support device supporting the filter septum to the filter body and engageable by the head member comprising:

i) a base element engaging the lower end of the filter septum, wherein the base element has a main extension substantially radial to the axis and wherein the base element has channels and/or holes through which filtered fuel flows in output from the lower end;

ii) a tubular element extending into the central cavity along the axis from the base element, wherein the tubular element has an outlet duct with a substantially annular cross-section defined by an outer circumferential wall which engages an inner wall of the filter septum and by an inner circumferential wall which defines along the axis a through central passage, wherein in said through central passage said rod-shaped device is extendable at the axis, wherein the outer circumferential wall and the inner circumferential wall respectively comprise at a top an outer sealing edge and an inner sealing edge sealingly engaging the head member;

iii) a separator element crossable by the filtered fuel to be separated from the water, wherein said separator element is housed on the base element and/or on the inner circumferential wall of the tubular element so that in the outlet duct flows the fuel filtered by the filter septum and separated from the water by the separator element;

wherein the head member is fluidically connected to a fuel circuit comprising the cartridge group, wherein the cartridge group is sealingly engaged to the head member so that the head member receives the filtered fuel separated from the water flowing into the outlet duct, wherein the head member comprises the rod-shaped device comprising the purge rod and/or support rod of the water level sensor, extending lengthwise along the axis inside the central through passage of the cartridge group.

18. The fuel filtration system according to claim 17, wherein the filter body comprises in a proximal region to a bottom wall a water collection region, positioned below the base element, and the rod-shaped device extends along the axis as far as said water collection region, engaging the bottom wall and a purge hole provided thereon.

19. The fuel filtration system according to claim 17, wherein the fuel comprises diesel fuel.

* * * * *